(12) United States Patent
Bradley et al.

(10) Patent No.: US 6,711,633 B2
(45) Date of Patent: Mar. 23, 2004

(54) 4:2 COMPRESSOR CIRCUIT FOR USE IN AN ARITHMETIC UNIT

(75) Inventors: Douglas Hooker Bradley, Austin, TX (US); Tai Anh Cao, Austin, TX (US); Robert Alan Philhower, Valley Cottage, NY (US); Wai Yin Wong, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 10/059,607

(22) Filed: Jan. 30, 2002

(65) Prior Publication Data

US 2003/0145032 A1 Jul. 31, 2003

(51) Int. Cl.[7] ................................................. G06F 3/00
(52) U.S. Cl. ........................ 710/29; 708/628; 708/708; 712/221
(58) Field of Search ............................ 710/1, 7, 29, 20, 710/33; 712/221, 225; 708/628, 708, 706, 653, 606, 629

(56) References Cited

U.S. PATENT DOCUMENTS

| | | | | |
|---|---|---|---|---|
| 5,146,424 A | * | 9/1992 | Peterson et al. | 708/706 |
| 5,426,600 A | * | 6/1995 | Nakagawa et al. | 708/653 |
| 5,588,006 A | * | 12/1996 | Nozuyama | 371/3 |
| 5,701,094 A | * | 12/1997 | Sridhar et al. | 326/113 |
| 5,835,393 A | * | 11/1998 | Melanson et al. | 708/628 |
| 6,530,079 B1 | * | 3/2003 | Choi et al. | 717/158 |

* cited by examiner

Primary Examiner—Kim Huynh
Assistant Examiner—Rijue Mai
(74) Attorney, Agent, or Firm—Joseph P. Lally; Casimer K. Salys

(57) ABSTRACT

A compressor circuit suitable for use in an arithmetic unit of a microprocessor includes a first stage, a second stage, a carry circuit, and a sum circuit. The first stage is configured to receive a set of four input signals. The first stage generates a first intermediate signal indicative of the XNOR of a first pair of the input signals and a second intermediate signal indicative of the XNOR of a second pair of the input signals. The second stage configured to receive at least a portion of the signals generated by the first stage. The second stage generates first and second control signals where the first control signal is indicative of the XNOR of the four input signals and the second control signal is the logical complement of the first signal. The carry circuit is configured to receive at least one of the control signals and further configured to generate a carry bit based at least in part on the state of the received control signal. The sum circuit is configured to receive at least one of the control signals and further configured to generate a sum bit based at least in part on the state of the received control signal. At least one of the first stage, second stage, sum circuit, and carry circuit include at least one CMOS transmission gate comprised of an n-channel transistor and a p-channel transistor having their source/drain terminals connected in parallel, wherein the p-channel transistor gate is driven by the logical complement of the n-channel transistor gate. In one embodiment, the first stage, second stage, carry circuit, and sum circuit are comprised primarily of such transmission gates to the exclusion of conventional CMOS complementary passgate logic.

24 Claims, 11 Drawing Sheets

| C | B | A | SUM | CARRY |
|---|---|---|-----|-------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

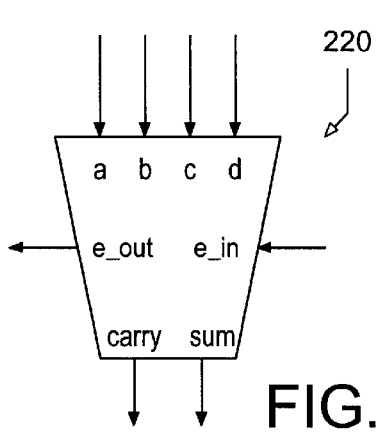
FIG. 7
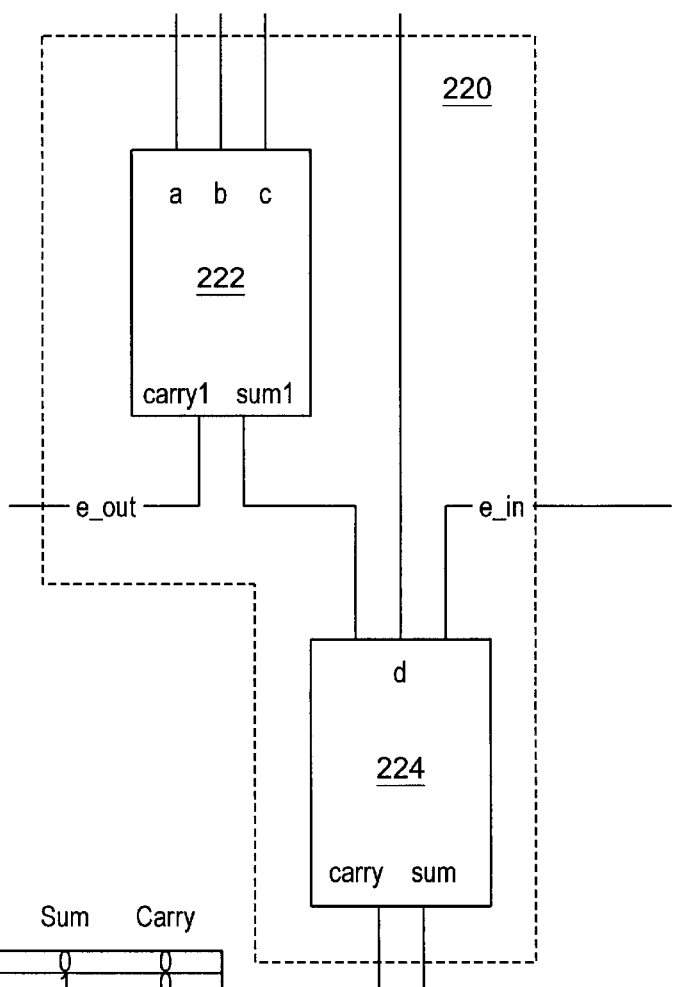
FIG. 8
FIG. 9

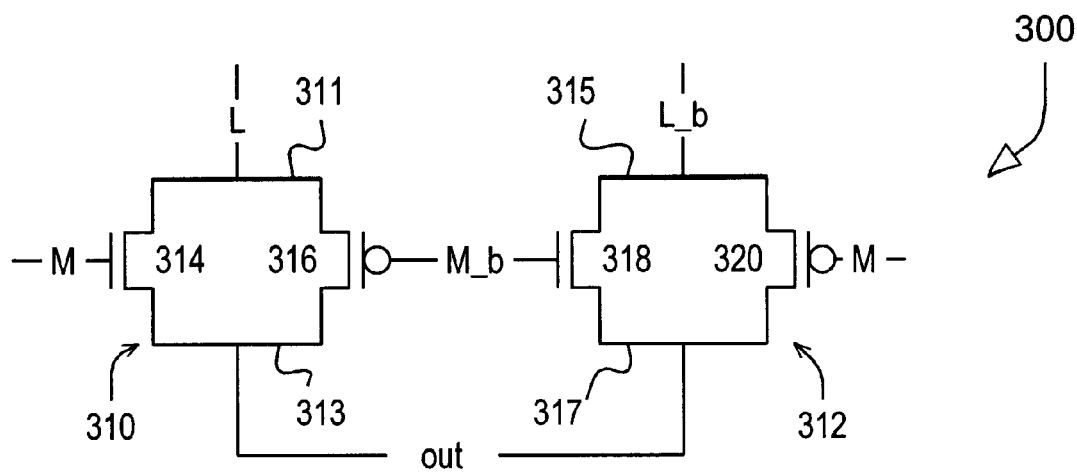
FIG. 10
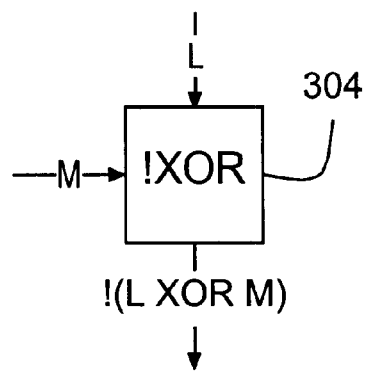
FIG. 11
FIG. 12

4:2 COMPRESSOR CIRCUIT FOR USE IN AN ARITHMETIC UNIT

BACKGROUND

1. Field of the Present Invention

The present invention generally relates to the field of digital circuits and more particularly to a 4:2 compressor circuit that facilitates computations in an arithmetic unit of a microprocessor.

2. History of Related Art

Data processing devices typically perform numeric multiplication in three general steps: (1) partial product generation; (2) partial product reduction; and (3) final addition. Multiplication of an n-bit number and an m-bit number generally produces a result up to n+m bits in length. For example, multiplication of a multiplicand of "11" and a multiplier of "11" yields a first partial product "11" and a second partial product "11." See, e.g., Eisig et al., Method and Apparatus for Re-Configuring a Partial Product Reduction Tree, U.S. Pat. No. 5,343,416. The second partial product is shifted left by one bit position. The sum of the two a partial products is the 4-bit result "1001."

As the number of bits in the operands increases, so does the number of partial products. Since speed is among the major factors in multiplier design, summing the partial products becomes problematic. When multiplying two sixty-four bit operands, for example, sixty-four partial products must be summed. Several methods exist for reducing the number of partial products.

A Booth decoding technique has been used to reduce the number of partial products by a factor of two or more. Even with a minimization scheme such as Booth, however, the problem of quickly adding the remaining partial products using a minimum amount of circuitry remains.

A second approach, which may be used in conjunction with the first approach, is the implementation of Carry-Save-Adders (CSAs), which are similar to full adders. A CSA is similar to a full adder in that it inputs three numbers and outputs two numbers. For this reason, a CSA is referred to herein as a 3:2 compressor. A tree of CSAs can be used to reduce a number of partial products to two numbers which can then be summed by a standard Carry-Propagate Adder. For wide operands, however, the number of stages of 3:2 compressors required may result in excessive propagation delay. To address this problem, so-called 4:2 compressors have been used to reduce the propagation delay by reducing the number of stages.

In a conventional implementation, 4:2 compressors employ complementary pass-gate logic (CPL). In CPL design, logic gates are implemented with transistors of a single polarity (typically n-channel) while transistors of the opposite polarity may be used to reduce the circuit's static current.

Referring to FIG. 16, an exclusive-or (EXOR) circuit 10 is depicted as implemented with a conventional CPL design. Circuit 10 receives input signals "a" and "b" and their corresponding complements (indicated by the apostrophe mark). The "a" signal is connected to the gate electrodes of n-channel transistors 12 and 14 while the a' signal is connected to the gate electrodes of n-channel transistors 16 and 18. The "b" signal is connected to the source electrode of transistors 14 and 16 while the "b'" signal is connected to the source electrode of transistors 12 and 18. The drain terminals of transistors 12 and 16 are tied together at node 20 while the drain terminals of transistors 14 and 18 are tied together at node 22. It can be easily verified that node 20 is the exclusive-or (EXOR) of signals "a" and "b" while node 22 is the negated EXOR (XNOR). CPL circuit 10 further includes cross-coupled p-channel transistors connected to nodes 20 and 22 to reduce static current by imposing a high impedance channel between the power supply and the logically low input signal.

When a logical "1" is passed through the source/drain of the n-channel device in a CPL circuit, a voltage of Vdd–Vtn is produced where Vdd is the supply voltage and Vtn is the n-channel threshold voltage. This passed voltage is typically restored through an inverter having relatively weak p-channel device and a relatively strong n-channel device. The speed of a CPL circuit is strongly dependent on the "high" voltage that is applied to the gate of the n-channel device to turn it on. The higher the voltage applied at the gate, the harder the n-channel device is turned on and the lower the channel resistance. Reduced channel resistance translates into reduced RC delay. Moreover, a higher voltage applied at the gate translates into a higher output voltage produced at the output end of the circuit. The higher output voltage beneficially improves the ability of the inverter to generate a logical "0" because the Vgs of the inverter's n-channel device is larger. In summary, a higher "1" voltage results in a faster CPL circuit and, conversely, a lower "1" voltage results in a slow CPL circuit. Unfortunately, CPL circuits are typically affected by a number of factors that can decrease the "1" voltage including coupling noise, delta-I noise, and DC voltage drop. Moreover, in silicon on insulator (SOI) devices, the voltage drop access the transistor tends to vary. This phenomenon is commonly referred to as the floating body effect or history effect and it can have a negative effect on the switching times of SOI devices. For these reasons, it is hard to model and predict the circuit speed. Scaling means applying successive generations of lower supply voltage process technology to the same circuit design. Unfortunately, scaling also means lower supply voltages that reduce the speed of CPL circuits thereby making them less scalable.

It would be desirable to implement a multiplier that optimized speed without undue expense in the form of a very complex or very large circuit. It would be further desirable if the implemented design was scalable and less dependent upon gate voltage than traditional CPL circuits.

SUMMARY OF THE INVENTION

The problem described above is addressed in the present invention by a compressor circuit suitable for use in an arithmetic unit of a microprocessor includes a first stage, a second stage, a carry circuit, and a sum circuit. The first stage is configured to receive a set of four input signals. The first stage generates a first intermediate signal indicative of the XNOR of a first pair of the input signals and a second intermediate signal indicative of the XNOR of a second pair of the input signals. The second stage configured to receive at least a portion of the signals generated by the first stage. The second stage generates first and second control signals where the first control signal is indicative of the XNOR of the four input signals and the second signal is the logical complement of the first signal. The carry circuit is configured to receive at least one of the control signals and further configured to generate a carry bit based at least in part on the state of the received control signal. The sum circuit is configured to receive at least one of the control signals and further configured to generate a sum bit based at least in part on the state of the received control signal. At least one of the first stage, second stage, sum circuit, and carry circuit include at least one CMOS transmission gate comprised of an n-channel transistor and a p-channel transistor having their source/drain terminals connected in parallel, wherein the p-channel transistor gate is driven by the logical complement of the n-channel transistor gate. In one embodiment, the first stage, second stage, carry circuit, and sum circuit are comprised primarily of such transmission gates to the exclusion of conventional CMOS complementary passgate logic.

BRIEF DESCRIPTION OF THE DRAWINGS

Other objects and advantages of the invention will become apparent upon reading the following detailed description and upon reference to the accompanying drawings in which:

FIGS. 7, 8, and 9 are a symbolic representation, a logical equivalent circuit representation, and a truth table for a 4:2 compressor;

FIGS. 10, 11, and 12 are a circuit diagram, a truth table, and a symbolic representation of an inverted exclusive-or circuit suitable for use in the 4:2 compressor according to the present invention;

Figure 1:
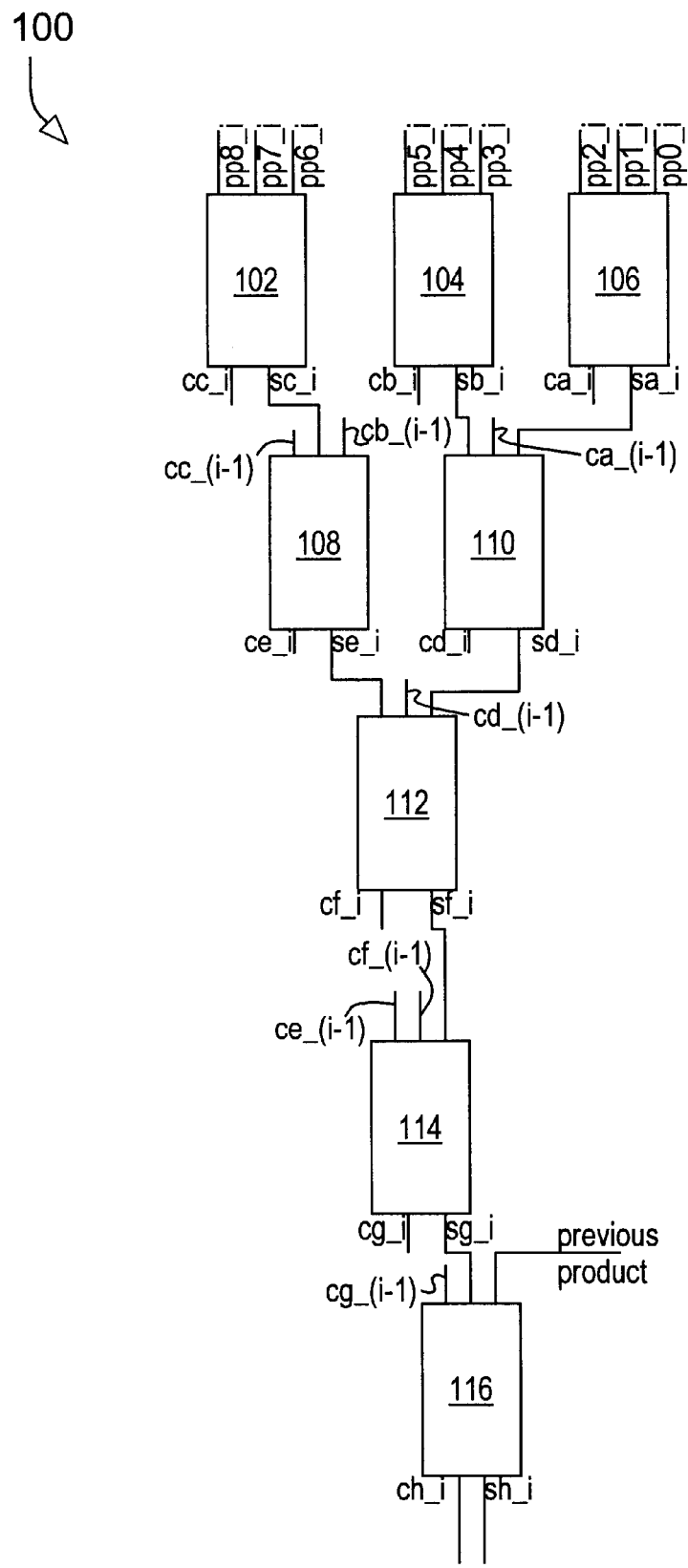
FIG. 1 is diagram of a Wallace tree circuit employing 3:2 compressors according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a high-speed 4:2 compressor circuit suitable for use in an arithmetic multiplication unit of a general purpose microprocessor in a data processing system. The data processing system would typically include at least one of the microprocessors, a system memory accessible to the processors, and one or more I/O devices including keyboard, mouse, and display terminal according to well known implementations. The 4:2 compressor circuit according to the present invention receives inputs from four partial products and a carry-in bit. The compressor generates a 2-bit result and a corresponding carry out signal based upon the state of the partial product and carry-in inputs. The compressor is preferably implemented entirely with CMOS transmission gates and inverters to minimize the critical path delay.

Turning now to the drawings, FIG. 1 illustrates a conventional Wallace tree circuit 100 suitable for summing, in this case, nine partial products denoted by PP0 through PP8. Such a circuit may be included within an arithmetic unit of a microprocessor or other data processing device. Circuit 100 comprises five stages of 3:2 compressors identified by reference numerals 102, 104, 106, 108, 110, 112, 114, and 116. The fifth stage (represented by compressor 116) of circuit 100 produces two numbers that may then be added together to produce a result such as the result of an arithmetic multiplication. Each 3:2 compressor 102 through 116 receives three inputs and generates corresponding sum and carry output. The carry outputs from each compressor 102 through 114 are provided to a Wallace tree structure (not depicted) corresponding to the next most significant bit. The carry outputs, denoted by the (i-1) designation, from the Wallace tree structure of a next lesser significant bit (not depicted) are provided to the inputs of the various compressors as shown.

Figures 2, 3:
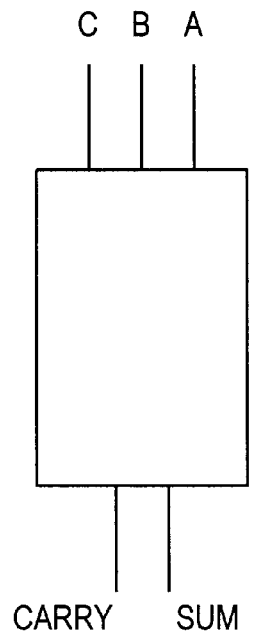
FIG. 2 is a symbolic representation of 3:2 compressors of FIG. 1.
FIG. 3 is a truth table for the 3:2 compressor of FIG. 2.

Referring to FIG. 2 and FIG. 3, a generic 3:2 compressor 120 suitable for use as 3:2 compressors 102 through 116 of FIG. 1 and its corresponding truth table 130 are depicted. As implied by its name, 3:2 compressor 120 receives three 1-bit inputs (A, B, and C) and produces two 1-bit outputs (SUM and CARRY). The SUM output is set to logical 1 if the exclusive-or (EXOR) of inputs A, B, and C is 1. The CARRY output is set to 1 if the number of inputs with the value 1 is two or more.

Returning to FIG. 1, those skilled in the field of digital logic will appreciate that each stage in circuit 100 has some finite delay where the delay represents the amount of time required for a stage to produce an output following receipt of an input. Assuming that the delay associated with each of the 3:2 compressors is substantially equal, the total delay represented by circuit 100 is at least five times the compressor delay. This delay may well be within the critical delay path of the multiplier. In other words, the performance of circuit 100 may represent a limiting factor on the performance of the multiplier. In such a case, alternative designs for circuit 100 may be required to improve multiplier and, ultimately, processor performance.

Figure 4:
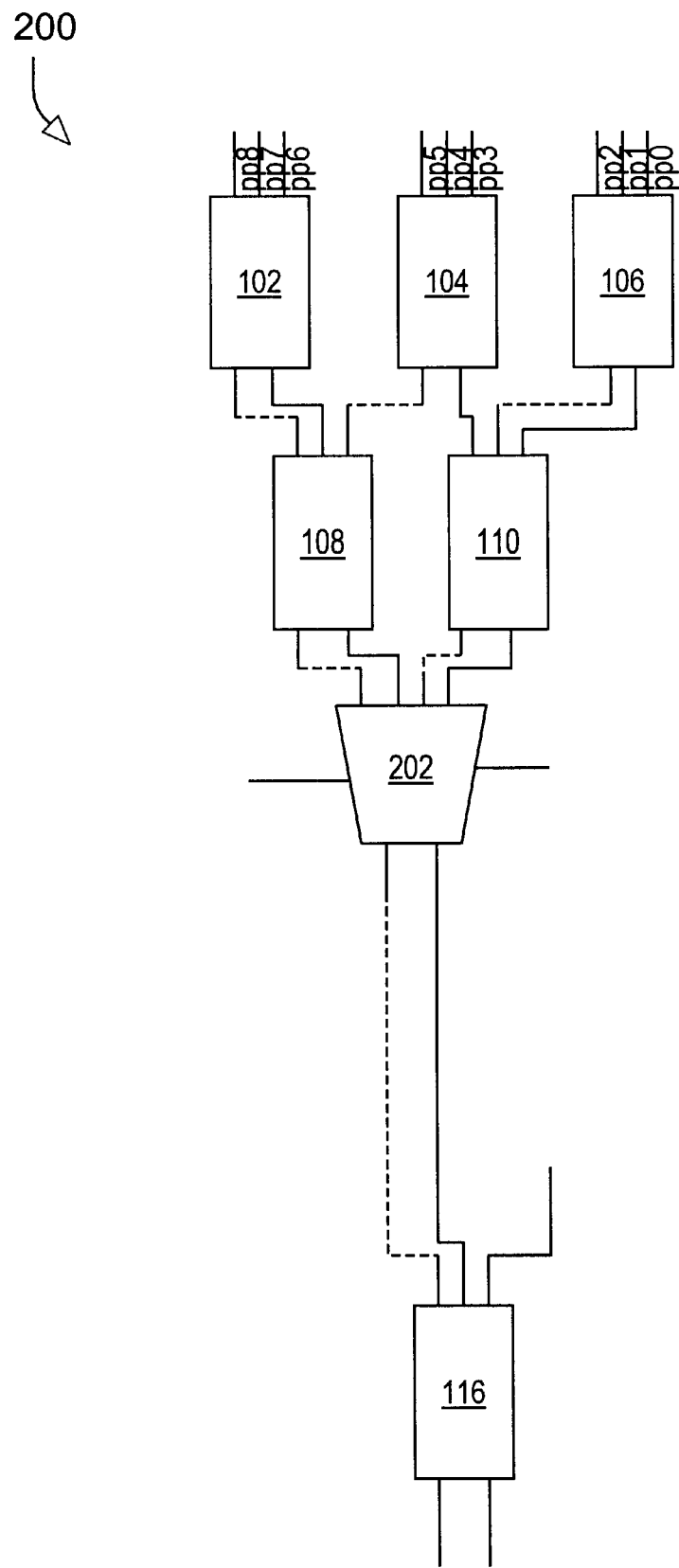
FIG. 4 is an embodiment of a Wallace tree circuit employing a 4:2 compressor according to one embodiment of the present invention.
Figure 5:
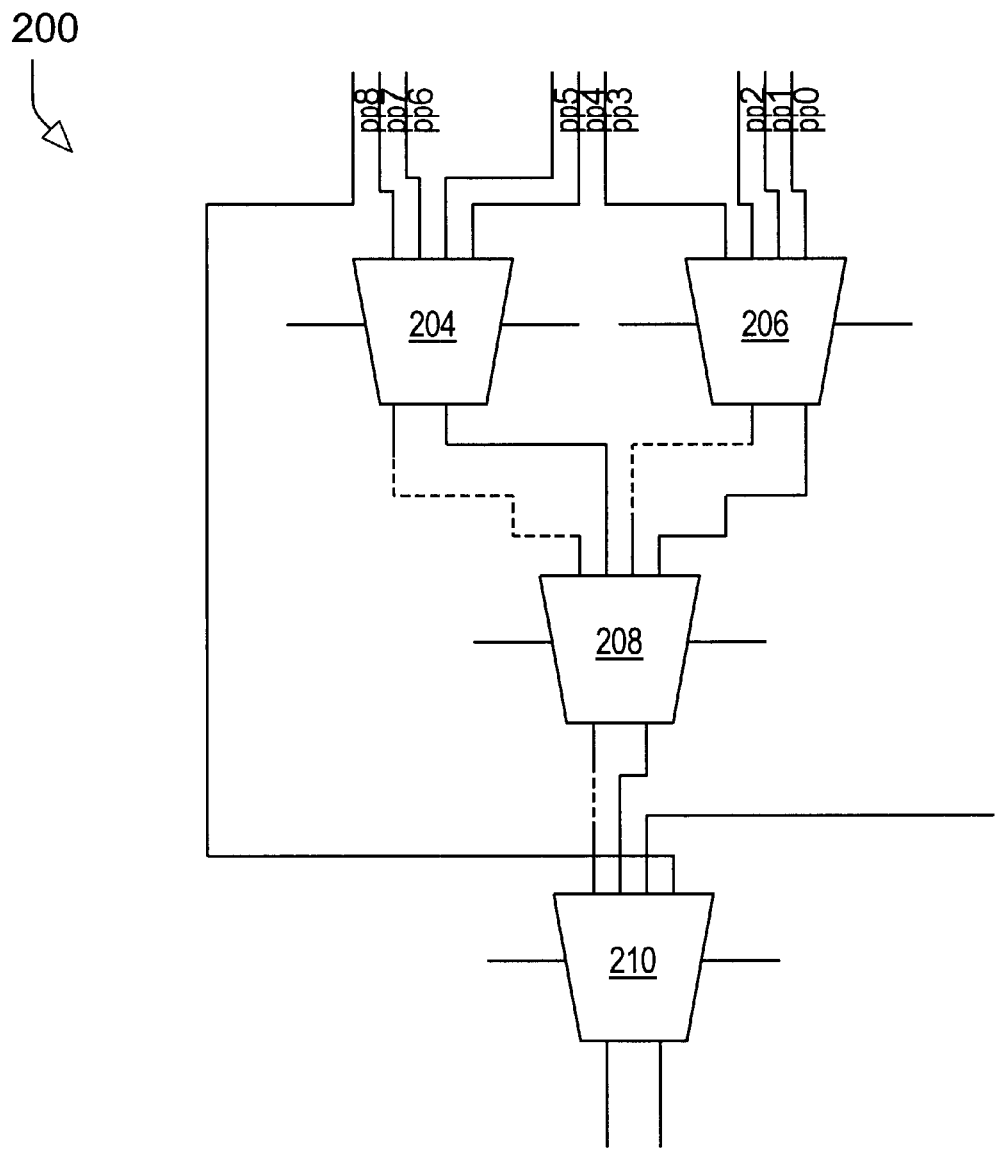
FIG. 5 is a second embodiment of a Wallace tree circuit employing 4:2 compressors according to the present invention.
Figure 6:
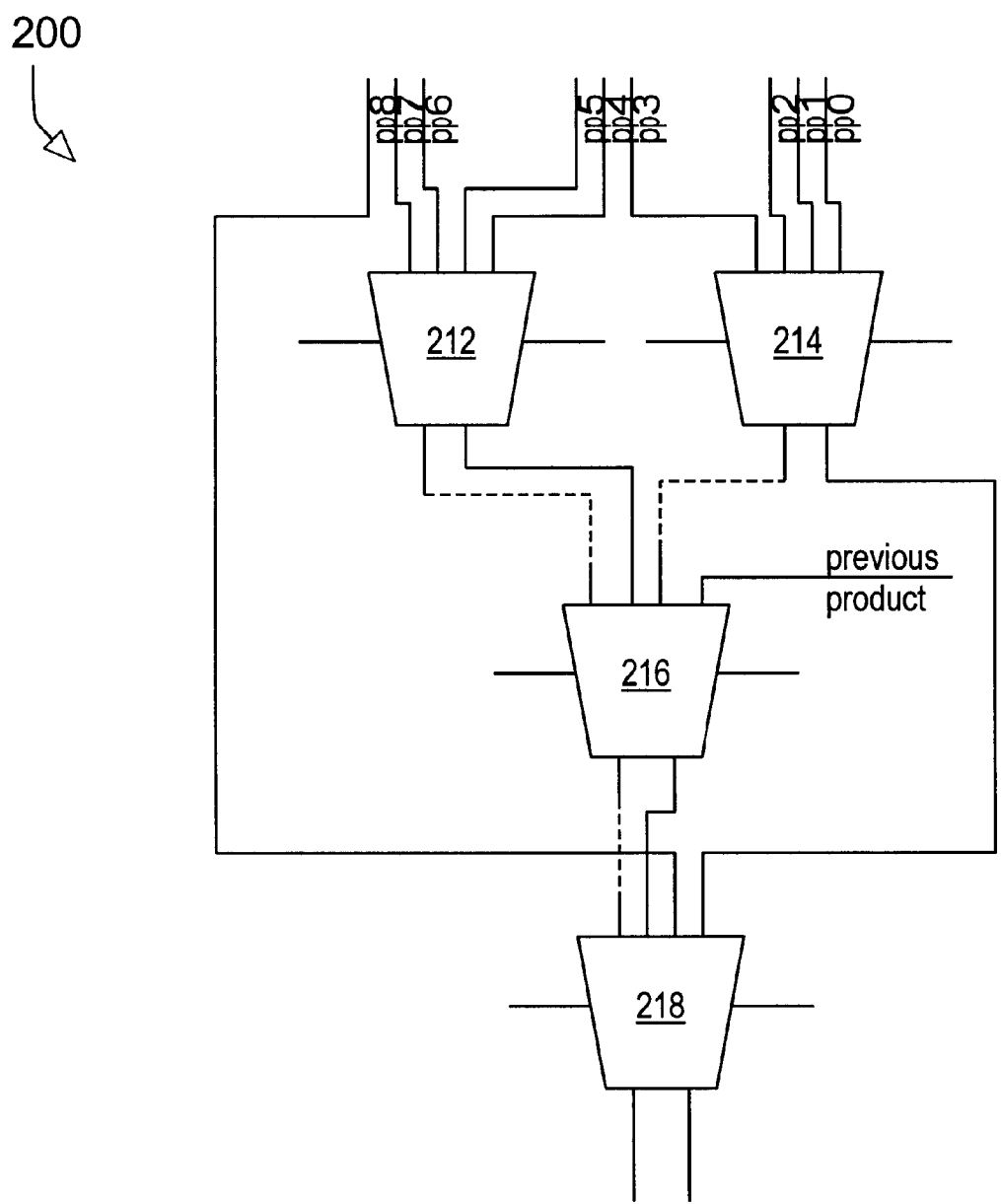
FIG. 6 is a third embodiment of a Wallace tree circuit employing 4:2 compressors according to the present invention.

In FIG. 4, FIG. 5, and FIG. 6, alternative embodiments of a circuit 200 suitable for summing partial products according to the present invention are depicted. (In each of these depictions, a dashed line indicates that a received carry bit is from a lesser significant bit position and that a generated carry bit is provided to a more significant bit position). Circuit 200 may be fabricated using an advanced semiconductor process technology such as silicon on insulator (SOI) designed for high performance integrated circuits. Each of the depicted embodiments of circuit 200 includes one or more 4:2 compressors identified by reference numerals 202 through 218. Referring momentarily to FIG. 7, FIG. 8, and FIG. 9, a generic 4:2 compressor 220 is depicted along with its equivalent circuit comprised of 3:2 compressors 222 and 224 and the corresponding truth table. As depicted, the 4:2 compressor is a misnomer for a circuit that actually receives five inputs (a, b, c, d, and e_in) and produces three outputs (sum, carry, and e_out). Inputs a, b, and c produce an intermediate result (identified as sum1) according to the summing rule for 3:2 compressors discussed previously. In addition, inputs a, b, and c determine a carry bit (identified as carry1) according to the 3:2 compressor rules. The carry1 bit equals the e_out of 4:2 compressor 220. Conceptually, the sum1 signal is provided to 3:2 compressor 224 along with inputs d and e_in to generate a sum signal and a carry signal according to the previously described rules for 3:2 compressors. VHDL descriptions of alternative embodiments of 4:2 compressors are included in an Appendix to this disclosure.

The partial products that are generated by a multiplier are typically multi-bit numbers. It is contemplated that a circuit 200 is required for each bit of the partial products. A 64-bit partial product implementation, for example, would require 64 instances of circuit 200. In such an embodiment, the e_in bit of a 4:2 compressor may be received from the e_out bit of the 4:2 compressor corresponding to the previous bit of the partial product (i.e., the adjacent bit position of less significance) with the slight caveat that the circuit 200 for bit position 0 does not receive an e_in signal and the circuit 200 for bit position 63 does not generate an e_out signal.

The use of 4:2 compressors in the depicted embodiments of circuit 200 results in fewer stages than a circuit, such as circuit 100, that uses 3:2 compressors exclusively. Whereas two stages of 3:2 compressors are required to reduce four partial products to two, the 4:2 compressor accomplishes this result in one stage. Assuming that the delay associated with the 4:2 compressor is less than twice the delay of the 3:2 compressor, the 4:2 compressor implementation is capable of achieving improved performance. With respect to the embodiments of FIG. 5 and FIG. 6, three stages of 4:2 compressors are required to accomplish the same result as five stages of 3:2 compressors depicted in FIG. 1. The performance of the two circuits would be equivalent when 3(DELAY4:2)=5(DELAY3:2) where DELAY4:2 represents the delay of a 4:2 compressor and DELAY3:2 represents the delay of a 3:2 compressor. Thus, performance is improved by circuit 200 when DELAY4:2<5/3 (DELAY3:2).

One embodiment of the present invention contemplates a fast 4:2 compressor circuit suitable for use in an arithmetic unit of a processor. The 4:2 compressor circuit according to one embodiment of the invention is comprised primarily of CMOS transmission gates to reduce the delay associated with convention complementary pass-gate logic (CPL) circuits. In CPL circuits, the floating body can alter the threshold voltage of the n-channel device in particular. An increased n-channel threshold voltage, in turn, will undesirably increase the switching time of the n-channel device thereby resulting in a slower gate, particularly when passing a logical "1." In a transmission gate circuit, this delay is less severe because a "1" is passed primarily through the circuit's p-channel devices while a "0" passes through the n-channel devices. The 4:2 compressor of the present invention may generate dual rail signals (i.e., true and complement signals) simultaneously to eliminate the delay associated with conventional inverters.

The transmission gates of the present invention must comply with certain basic requirements. For all logical input combinations, intermediate nodes inside the transmission gate circuit must never float. There must always be a path from each intermediate node to one of the inputs, which include ground and Vdd. Moreover, in steady state, the intermediate nodes cannot be driven by two conflicting circuits (i.e., driven by a logical "1" from one circuit and by logical "0" by another circuit). In addition, in cases where a gate is passing a constant "1," only the p-channel devices is needed while, in cases of passing a constant "0," only n-channel devices are needed.

Referring now to FIGS. 10, 11, and 12, a diagram of an XNOR circuit 300 and its corresponding truth table 302 and circuit symbol 304 are presented. XNOR circuit 300 is widely employed in one embodiment of a 4:2 compressor circuit 220 according to the present invention. Circuit 300 includes first and second CMOS transmission gates 310 and 312 respectively. First transmission gate 310 includes an NMOS transistor 314 and a PMOS transistor 316 connected in parallel (i.e., having their respective sources connected to a common source node 311 and their respective drains connected to a common drain node 313). Similarly, second transmission gate 312 includes an NMOS transistor 318 and a PMOS transistor 320 connected in parallel via source node 315 and drain node 317. (It will be appreciated that the source and drain terminals of transistors 314, 316, 318, and 320 in this configuration are substantially interchangeable and that the use of those terms herein is intended primarily to distinguish between the two nodes). The gate electrodes of the first transmission gate PMOS transistor 316 and the second transmission gate NMOS transistor 318 are driven by a common signal (identified as the input signal M_b) while the gate electrodes of first transmission gate NMOS transistor 314 and second transmission gate PMOS transistor 320 are also driven by a common signal (identified as the input signal M). The "_b" notation indicates the logical complement such that, for example, signals M and M_b are logical complements of each other.

The source node 311 of first transmission gate 310 is connected to a signal identified as L while the source node 315 of second transmission gate 312 is connected to a signal identified as L_b where L and L_b are logical complements. The drain nodes 313 and 317 of first and second transmission gates 310 and 312 are tied together and provide the output signal (out) of circuit 300. When signal M is equal to logical 1 (i.e., logical TRUE), M_b is FALSE and the channels of transistors 314 and 316 of first transmission gate 310 are in a low impedance state. Simultaneously, the transistors 318 and 320 of second transmission gate are in a high impedance state. Under these conditions, signal L on source node 311 is connected to the output via node 313. If M is false, the opposite transistor states apply and the signal L_b on node 316 is connected to the output via node 317. Referring to truth table 302 of FIG. 11, circuit 300 produces the logical equivalent of an inverted EXOR function. (EXOR of A and B is TRUE if A is not equal to B).

It will be appreciated that XNOR circuit 300 is comprised exclusively of CMOS transmission gates and that the total delay is merely the transmission delay of a transmission gate (the delay required for a signal on the source node to propagate to the drain node). Because circuit 300 is beneficial in achieving a fast 4:2 compressor according to one embodiment of the present invention, the circuit is given the symbol identified by reference numeral 304 in FIG. 12.

Figure 13:
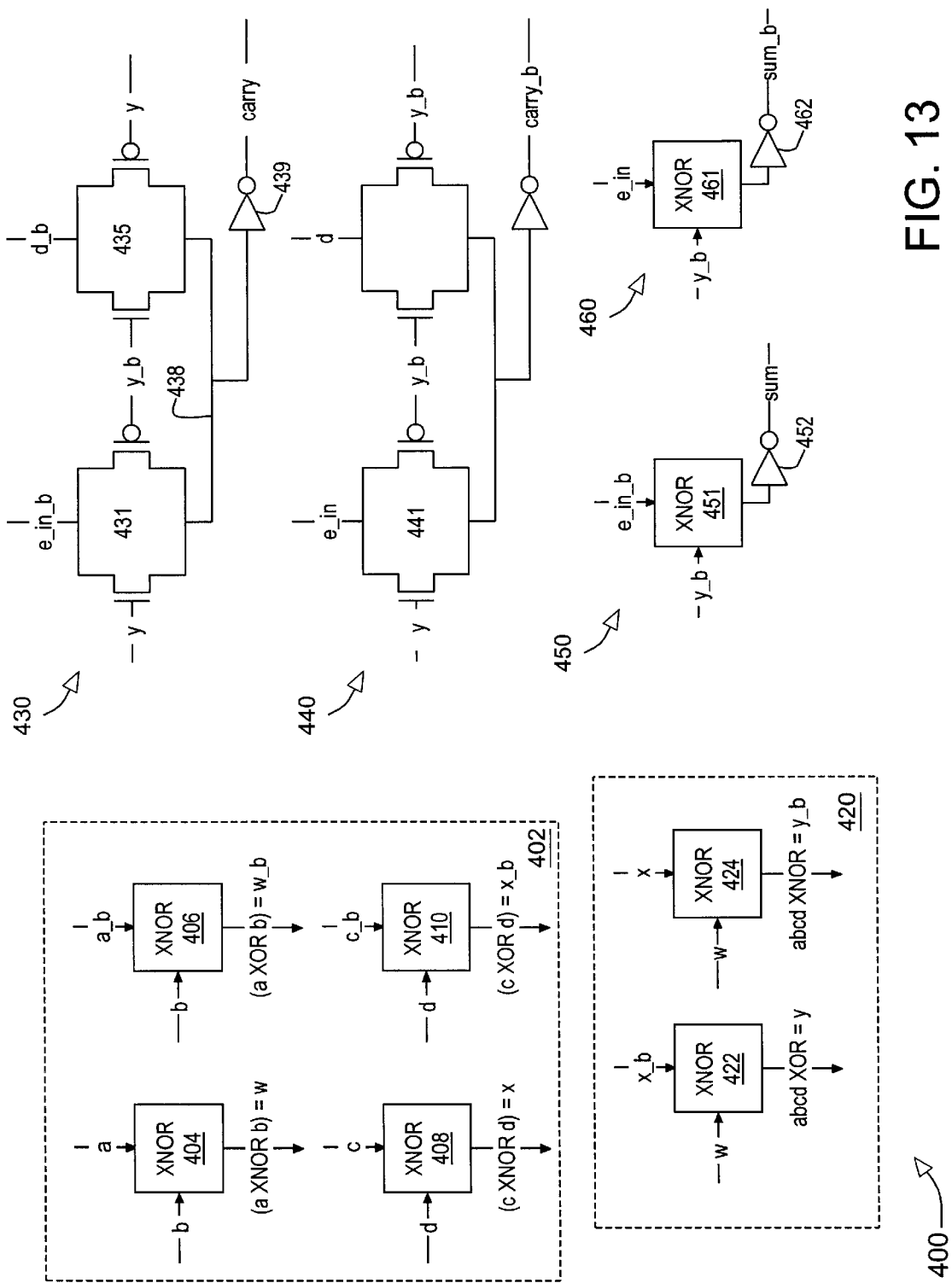
FIGS. 13 and 14 are a circuit diagram of a 4:2 compressor according to one embodiment of the present invention.
Figure 14:
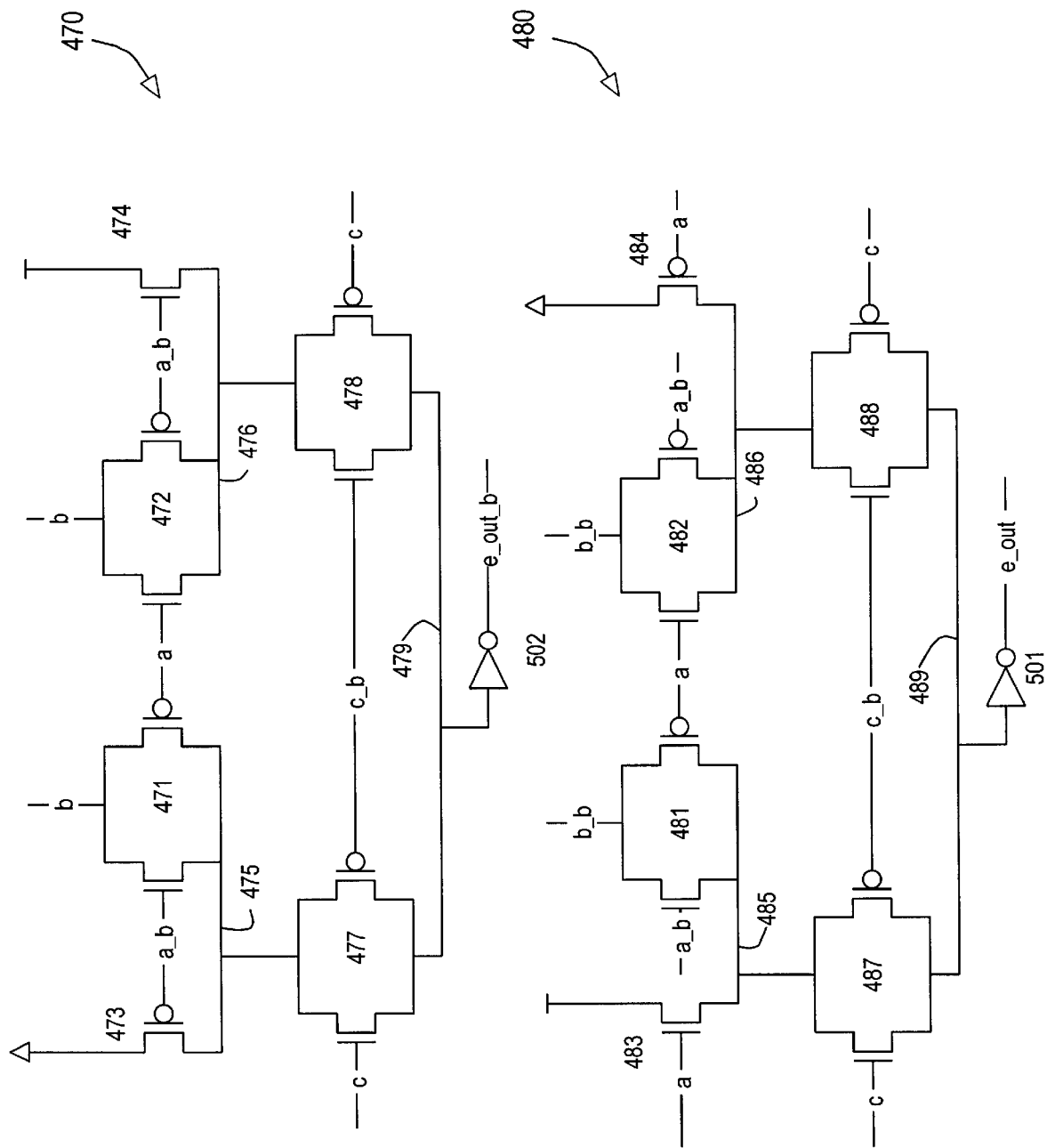

Turning now to FIG. 13, an embodiment of a 4:2 compressor 400 according to one embodiment of the invention is depicted (additional elements of compressor 400 are shown in FIG. 14). The depicted embodiment of compressor 400 includes a first stage 402 that receives the input signals a, b, c, and d and generates a pair of intermediate signals representing the logical values (a XNOR b) and (c XNOR d) and their logical complements where XNOR refers to the inverted EXOR function described above with respect to FIGS. 10, 11, and 12. In this manner, first stage 402 generates a set of four signals including a first signal representing the inverted EXOR of a first pair of input signals (e.g., signals a and b), a second signal representing the inverted EXOR of a second pair of input signals (e.g., signals c and d) and their logical complements.

The depicted embodiment of first stage 402 generates these signals via a set of four XNOR circuits 404, 406, 408, and 410 each of which is implemented as the XNOR circuit 300 of FIG. 10. The "a" signal provides the input to circuit 404 while the "a_b" signal provides the input to circuit 406. Circuits 404 and 406 are both gated (controlled) by the "b" signal. The "c" signal provides the input to circuit 408 while the "c_b" signal provides the input to circuit 410. Circuits 408 and 410 are gated by the "d" signal. The output signals generated by first stage 402 are indicated by the letters "w" (a XNOR b), "w_b" (a_b XNOR b), "x" (c XNOR d), and "x_b" (c_b XNOR d).

The intermediate signals w, w_b, x, and x_b generated by first stage 402 are routed to a second stage 420 of compressor 400 to produce a control signal representing the XNOR of compressor input signals a, b, c, and d (denoted as y_b) and its logical complement (denoted as y). The depicted embodiment of second stage 420 includes a pair of XNOR circuits 422 and 424, both of which are implemented as XNOR circuit 300. Circuit 422 receives the x_b signal generated by circuit 410 while circuit 424 receives the x signal generated by circuit 408. Circuits 422 and 424 are both gated by the w signal generated by XNOR circuit 404.

The control signals y and y_b generated by second stage 420 of compressor 400 control the selection of the compressor output (sum, carry, and their complements). The depicted embodiment of compressor 400 includes a carry circuit 430 and a complementary carry circuit 440. Carry circuit 430 includes a first transmission gate 431 and a second transmission gate 435. First transmission gate 431 receives the logical complement of the e_in signal (e_in_b) as its input and is gated by the y signal generated in second stage 420 and its logical complement y_b. Second transmission gate 435 receives the "d" signal as its input and is gated by the y_b signal and its logical complement y. The outputs of transmission gates 431 and 435 are connected to a common node 438. Node 438 is connected to an inverter 439 that is desirable to provide a signal that is capable of driving one or more subsequent gates. The output of inverter 439 represents the carry output signal of compressor 400. The depicted embodiment of compressor 400 includes a complementary carry circuit 440 that receives the non-inverted e_in signal and the non-inverted "d" signal as its inputs and is gated by the y_b signal to produce the logical complement of the carry signal simultaneously with the generation of the carry signal itself. Thus, the embodiment of compressor 400 depicted in FIG. 13 is configured to generate dual rail outputs (i.e., the true and complement of a particular signal) simultaneously.

FIG. 13 further includes a sum circuit 450 and a complementary sum circuit 460 that simultaneously generate the true and complement of the compressor output sum signal. The depicted embodiment of sum circuit 450 is implemented with an XNOR circuit 451 that receives the logical complement of the compressor input signal e_in as its input signal and is gated by the y_b signal produced in second stage 420. The complementary sum circuit 460 comprises and XNOR circuit that receives the e_in signal and is gated by the y_b signal. Sum circuit 450 and complementary sum circuit 460 both include inverters 452 and 462 respectively on their outputs to provide a signal of sufficient drive capability. In cases where e_in is guaranteed to be "0," such as in the least significant bit position, circuits 430, 440, 450, and 460 can be simplified to reduce the transistor count. More specifically, circuits 451 and 461 can be replaced with wires connecting the respective y b signal to inverters 452 and 462. In addition, the n-channel device of transmission gate 431 of circuit 430 can be eliminated and the source of the p_channel transistor can be connected to ground. Similarly, the p-channel device of transmission gate 441 can be eliminated while the drain of the n-channel device is connected to Vcc.

Referring now to FIG. 14, the depicted embodiment of compressor 400 further includes an e_out circuit 480 and a complementary e_out circuit 470 that simultaneously produce the true and complement of the compressor e_out output signal. The e_out circuit 480 includes a first transmission gate 481 that receives the "b_b" signal as its input and is gated by the "a-b" signal and a second transmission gate 482 that receives the "b_b" signal as its input and is gated by the "a" signal. An output node 485 of transmission gate 481 is connected to the output of NMOS transistor 483. The drain of transistor 483 is connected to Vdd and the transistor gate is controlled by the "a" signal. When the "a-b" signal is TRUE, output node 485 is equal to the "b_b" signal. When the "a" signal is TRUE, output node 485 is always true.

Transmission gate 482 receives the "b_b" signal as its input and is gated by the "a" signal such that, when the "a" signal is TRUE, output node 486 is equal to b_b. When a is FALSE, output node 486 is connected to the ground (logical FALSE) through NMOS transistor 484. Output nodes 485 and 486 provide the inputs to transmission gates 487 and 488 respectively. Transmission gate 487 is controlled by the "c" signal while transmission gate 488 is controlled by the "c b" signal. Transmission gates 487 and 488 share a common output node 489 that is connected to a driver inverter 501. The output of driver inverter 501 represents the e_out signal.

Complementary e_out circuit 470 is implemented as the logical inverse of circuit 480. More specifically, circuit 470 includes a transmission gate 471 that receives the "b" signal as its input and is gated by the "a-b" signal. Output node 475 of transmission gate 471 is connected to the source of PMOS transistor 473, which has its drain tied to ground. In this manner, output node 475 is equal to b when the "a-b" signal is TRUE and is equal to FALSE when a_b is FALSE. Transmission gate 472 receives the "b" signal as its input and is gated by the "a" signal. The output node 476 of transmission gate 472 is connected to the source of NMOS transistor 474, which is controlled by the "a-b" signal. In this manner, output node 476 is equal to the "b" signal when the "a" signal is TRUE and is equal to TRUE when the "a" signal is FALSE.

Output nodes 475 and 476 provide input signals for transmission gates 477 and 478 respectively. Transmission gate 477 is controlled by the "c" signal while transmission gate 478 is gated by the "c_b" signal such that the common output node 479 is equal to node 475 when the "c" signal is TRUE and is equal to node 476 when the "c" signal is FALSE. Output node 479 is connected to a driver inverter 502 that produces the complementary e_out signal.

Compressor 400 as depicted in FIG. 13 and FIG. 14 generates simultaneous dual-rail outputs at the expense of the complementary circuits 440, 460, and 480. The production of simultaneous dual rail outputs eliminates the need to subsequently invert the output signals as they are delivered to the next stage of whatever circuit is implemented. In other embodiments, the space required to implement the complementary circuits 440, 460, and 480 may represent a more significant design limitation than the delay that the complementary circuits eliminate. In such an embodiment, the redundant circuits 440, 460, and 480 may be deleted and replaced with inverters that are connected to the outputs of circuits 430, 450, and 470 respectively.

A compressor implementation of particular interest employs either e_out circuit 480 or its complementary e_out circuit 470, but not both. In implementing a 4:2 compressor, it is critical that the delay associated with the carry generation path is less than the delay of the sum path. To minimize carry generation delay, it is desirable to eliminate all unnecessary circuits. Referring back to carry generation circuit 430 of FIG. 8, it is seen that the one of the circuit's inputs is the e_in_b signal. If the compressors used to implement the adder include e_out generation circuit 480, but not its complementary circuit 470, then an inverter is required between the output of circuit 480 and the carry generation circuit 430 to which it is connected. Such an inverter would add delay that is highly undesirable. To optimize the carry generation path while minimizing the complexity and size of the compressors, one embodiment of the invention may include the e_out_b generation circuit 470, but not its complementary circuit e_out generation circuit 480. VHDL descriptions of alternative embodiments of e_out circuit 480 and e_out_b circuit 470 are included in the Appendix attached hereto.

Figure 15:
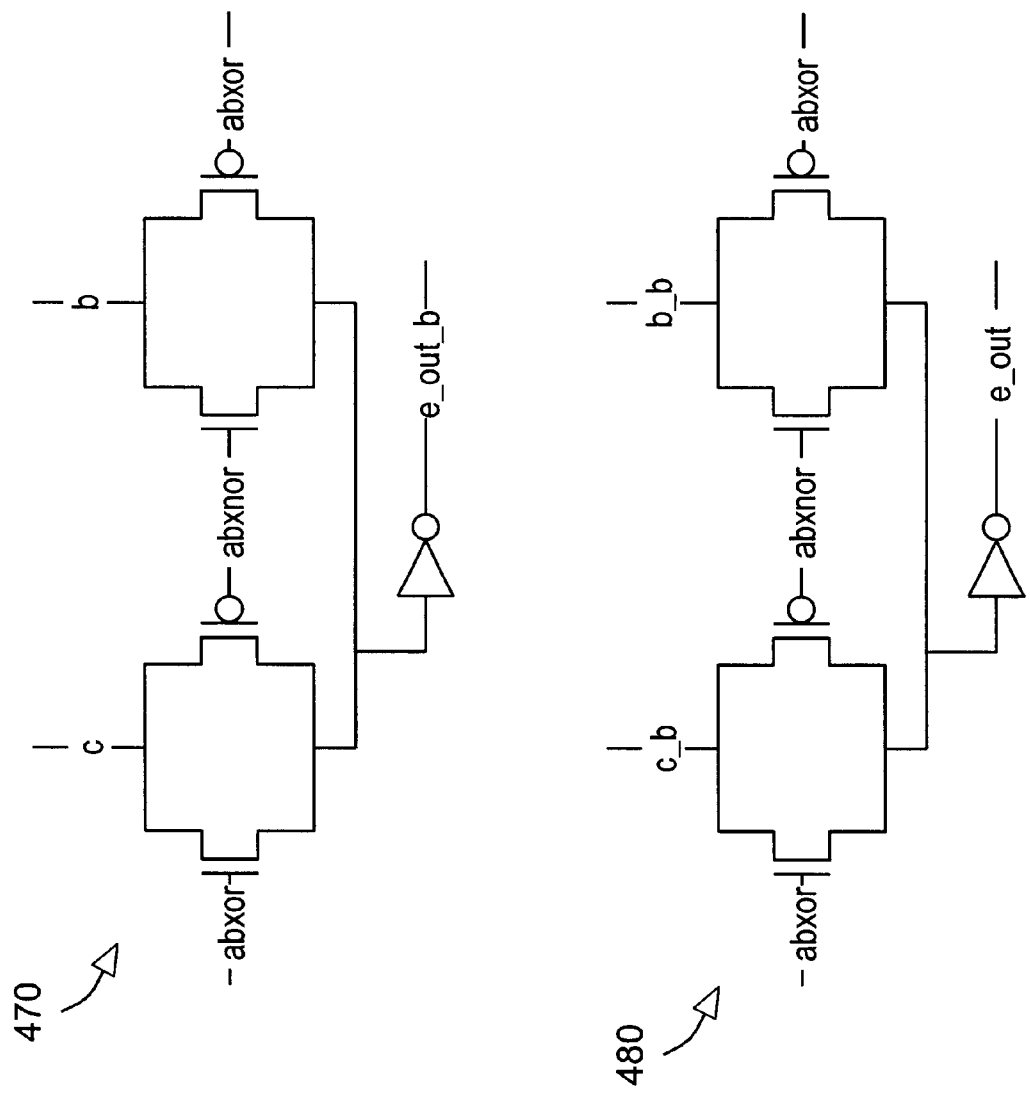
FIG. 15 is a circuit diagram of an alternative embodiment of portion of the compressor of FIG. 14.
Figure 16:
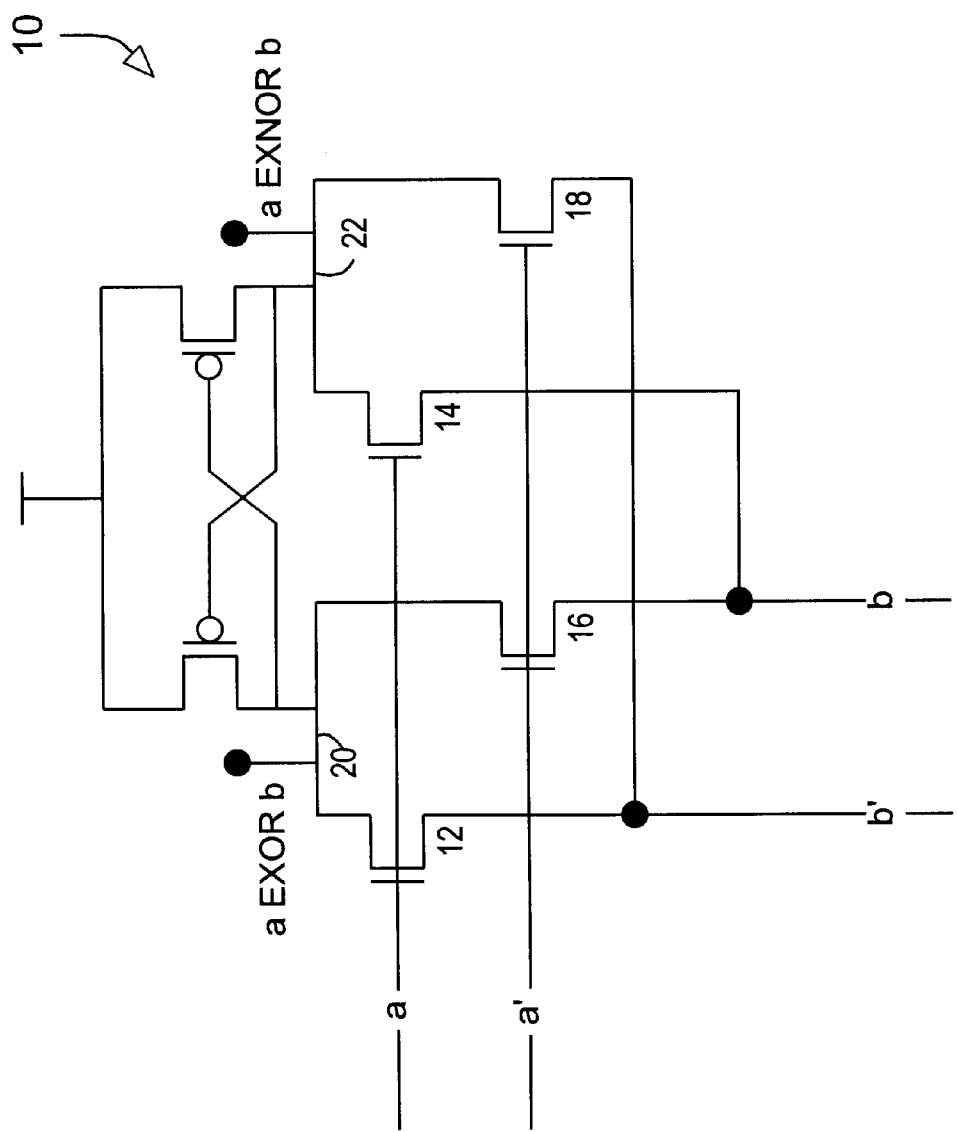
FIG. 16 is a circuit diagram of a complementary pass gate logic circuit according.

Still other implementations may employ a combination of the dual rail embodiment of compressor 400 (the embodiment that includes redundant circuits 440, 460, and 480) and the single rail embodiment (the embodiment that does not include the redundant circuits). Referring to FIG. 5, for example, the 4:2 compressors 204 and 206 in the first stage of circuit 200 may be implemented as 4:2 compressors in which inputs are of single rail and outputs are of dual rails while the remaining 4:2 compressors are implemented as simultaneous dual rail compressors. FIG. 15 depicts alternative embodiments of e_out circuit 480 and e_out_-b circuit 470. In this embodiment, circuits 470 and 480 use the abxnor and abxor signals generated by circuit 402 (FIG. 13) to generate the e_out signals. This embodiment beneficially reduces the number of transistors required to generate the signals.

It will be apparent to those skilled in the art having the benefit of this disclosure that the present invention contemplates the use of a 4:2 compressor circuit that uses transmission gate circuits and inverter circuits to minimize propagation delay and improve the performance of an arithmetic unit in which the compressor is used. It is understood that the form of the invention shown and described in the detailed description and the drawings are to be taken merely as presently preferred examples. It is intended that the following claims be interpreted broadly to embrace all the variations of the preferred embodiments disclosed.

APPENDIX

```
--*!****************************************************************
--*! @ 1997, 1998 International Business Machines Corp.
--*!      All Rights Reserved
--*!****************************************************************
-- TITLE          : csa_4to2_single_rail_generic_first
----------------------------- LIBRARY REFERENCES -----------------------------
LIBRARY IEEE; USE ieee.std_logic_1164.ALL;
LIBRARY STD; USE std.standard.ALL;
LIBRARY IBM; USE ibm.std_ulogic_support.ALL;
LIBRARY gr_lib;
USE ibm.synthesis_support.ALL;
USE ibm.texsim_attributes.ALL;
USE ibm.texsim.ALL;
USE gr_lib.gr_latches_pkg.ALL;
USE gr_lib.gr_lcb_pkg.ALL;
USE gr_lib.gr_support_pkg.ALL;
----------------------------- ENTITY DECLARATION -----------------------------
ENTITY csa_4to2_single_rail_generic_first IS
    PORT(
    -- INPUT
        a            : IN std_ulogic;
        b            : IN std_ulogic;
        c            : IN std_ulogic;
        d            : IN std_ulogic;
        e_in         : IN std_ulogic;
    -- OUTPUT
        sum          : OUT std_ulogic;
        carry        : OUT std_ulogic;
        e_out        : OUT std_ulogic
        );
END csa_4to2_single_rail_generic_first;
ARCHITECTURE csa_4to2_single_rail_generic_first OF csa_4to2_single_rail_generic_first IS
    *** *** *** *** *** *** *** *** START LOGIC *** *** *** *** *** *** *** ***
    signal a_b        : std_ulogic;
    signal b_b        : std_ulogic;
    signal c_b        : std_ulogic;
    signal d_b        : std_ulogic;
    signal sum_1st    : std_ulogic;
    signal carry_eq   : std_ulogic;
    signal sum_eq     : std_ulogic;
    signal cout_eq    : std_ulogic;
    --signal e_in     : std_ulogic;
BEGIN
a_b <= NOT a;
```

-continued

APPENDIX

```
b_b    <= NOT b;
c_b    <= NOT c;
d_b    <= NOT d;
--e_in <= NOT e_in_b;
--1st 3:2 compressor
sum_1st    <= ((a_b ) AND (b_b ) AND c ) OR
           ( (a_b ) AND b AND (c_b )) OR
           (       a AND (b_b ) AND (c_b )) OR
           (       a AND b AND c) ;
cout_eq    <= ((a_b ) AND b AND c) OR
           (       a AND(b_b ) AND c) OR
           (       a AND b AND(c_b )) OR
           (       a AND b AND c) ;
--2nd 3:2 compressor
sum_eq     <= ((NOT sum_1st) AND (d_b ) AND e_in) OR
           ( (NOT sum_1st) AND d AND (NOT e_in)) OR
           (   sum_1st AND (d_b ) AND (NOT e_in)) OR
           (   sum_1st AND d AND e_in) ;
carry_eq   <= ((NOT sum_1st) AND d AND e_in) OR
           (   sum_1st AND(d_b ) AND e_in) OR
           (   sum_1st AND d AND NOT e_in)) OR
           (   sum_1st AND d AND e_in) ;
sum     <= sum_q    ;
carry   <= carry_eq ;
e_out   <= cout_eq  ;
END csa_4to2_single_rail_generic_first;
-- TITLE  : csa_4to2_single_rail_generic_second
--------------------------- LIBRARY REFERENCES ---------------------------
LIBRARY IEEE; USE ieee.std_logic_1164.ALL;
LIBRARY STD; USE std.standard.ALL;
LIBRARY IBM; USE ibm.std_ulogic_support.ALL;
LIBRARY gr_lib;
USE ibm.synthesis_support.ALL;
USE ibm.texsim_attributes.ALL;
USE ibm.texsim.ALL;
USE gr_lib.gr_latches_pkg.ALL;
USE gr_lib.gr_lcb_pkg.ALL;
USE gr_lib.gr_support_pkg.ALL;
--------------------------- ENTITY DECLARATION ---------------------------
ENTITY csa_4to2_single_rail_generic_second IS
    PORT(
    -- INPUT
        a       : IN std_ulogic;
        b       : IN std_ulogic;
        c       : IN std_ulogic;
        d       : IN std_ulogic;
        e_in    : IN std_ulogic;
    -- OUTPUT
        sum     : OUT std_ulogic;
        carry   : OUT std_ulogic;
        e_out   : OUT std_ulogic
        );
END csa_4to2_single_rail_generic_second;
ARCHITECTURE csa_4to2_single_rail_generic_second OF
csa_4to2_single_rail_generic_second IS
   *** *** *** *** *** *** *** *** START LOGIC *** *** *** *** *** *** *** ***
signal a_b        : std_ulogic;
signal b_b        : std_ulogic;
signal c_b        : std_ulogic;
signal d_b        : std_ulogic;
signal sum_1st    : std_ulogic;
signal carry_eq   : std_ulogic;
signal sum_eq     : std_ulogic;
signal cout_eq    : std_ulogic;
--signal e_in     : std_ulogic;
BEGIN
a_b    <= NOT a;
b_b    <= NOT b;
c_b    <= NOT c;
d_b    <= NOT d;
--e_in <= NOT e_in_b ;
--1st 3:2 compressor
sum_1st    <= ((a_b ) AND (b_b ) AND c) OR
           ( (a_b ) AND b AND (c_b )) OR
           (       a AND (b_b ) AND (c_b )) OR
           (       a AND b AND c) ;
cout_eq    <= ((a_b ) AND b AND c) OR
```

-continued

APPENDIX

```
             (        a AND (b_b ) AND c) OR
             (        a AND b AND (c_b )) OR
             (        a AND b AND c) ;
--2nd 3:2 compressor
sum_eq        <= ((NOT sum_1st) AND (d_b ) AND e_in) OR
             ( (NOT sum_1st) AND d AND NOT e_in)) OR
             (        sum_1st AND (d_b ) AND NOT e_in)) OR
             (        sum_1st AND d AND e_in) ;
carry_eq      <= ((NOT sum_1st) AND d AND e_in) OR
             (        sum_1st AND (d_b ) AND e_in) OR
             (        sum_1st AND d AND (NOT e_in)) OR
             (        sum_1st AND d AND e_in) ;
sum       <= sum_q    ;
carry     <= carry_eq ;
e_out     <= cout_eq  ;
END csa_4to2_single_rail_generic_second;
-- TITLE  : csa_4to2_single_rail_e_out_b_first
ENTITY csa_4to2_single_rail_e_out_b_first IS
    PORT(
    -- INPUT
        a           : IN std_ulogic;
        b           : IN std_ulogic;
        c           : IN std_ulogic;
        d           : IN std_ulogic;
        e_in_b      : IN std_ulogic;
    -- OUTPUT
        sum         : OUT std_ulogic;
        carry       : OUT std_ulogic;
        e_out_b     : OUT std_ulogic
        );
END csa_4to2_single_rail_e_out_b_first;
ARCHITECTURE csa_4to2_single_rail_e_out_b_first OF csa_4to2_single_rail_e_out_b_first IS
-- *** *** *** *** *** *** *** *** START LOGIC *** *** *** *** *** *** *** ***
signal a_b           : std_ulogic;
signal b_b           : std_ulogic;
signal c_b           : std_ulogic;
signal d_b           : std_ulogic;
signal sum_1st       : std_ulogic;
signal carry_eq      : std_ulogic;
signal sum_eq        : std_ulogic;
signal cout_eq       : std_ulogic;
signal e_in          : std_ulogic;
BEGIN
a_b <= NOT a;
b_b <= NOT b;
c_b <= NOT c;
d_b <= NOT d;
e_in <= NOT e_in_b;
--1st 3:2 compressor
sum_1st       <= ((a_b ) AND (b_b ) AND c) OR
             ( (a_b ) AND b AND (c_b )) OR
             (        a AND(b_b ) AND (c_b )) OR
             (        a AND b AND c) ;
cout_eq       <= ((a_b ) AND b AND c ) OR
             (        a AND(b_b ) AND c) OR
             (        a AND b AND (c_b )) OR
             (        a AND b AND c) ;
--2nd 3:2 compressor
sum_eq        <= ((NOT sum_1st) AND (d_b ) AND e_in) OR
             ( (NOT sum_1st) AND d AND NOT e_in)) OR
             (        sum_1st AND (d_b ) AND NOT e_in)) OR
             (        sum_1st AND d AND e_in) ;
carry_eq      <= ((NOT sum_1st) AND d AND e_in) OR
             (        sum_1st AND (d_b ) AND e_in) OR
             (        sum_1st AND d AND NOT e_in)) OR
             (        sum_1st AND d AND e_in) ;
sum       <= sum_q         ;
carry     <= carry_eq      ;
e_out_b   <= NOT cout_eq   ;
END csa_4to2_single_rail_e_out_b_first;
-- TITLE  : csa_4to2_single_rail_e_out_b_second
---------------------------- LIBRARY REFERENCES ----------------------------
LIBRARY IEEE; USE ieee.std_logic_1164.ALL;
LIBRARY STD; USE std.standard.ALL;
LIBRARY IBM; USE ibm.std_ulogic_support.ALL;
LIBRARY gr_lib;
USE ibm.synthesis_support.ALL;
```

-continued

APPENDIX

```
USE ibm.texsim_attributes.ALL;
USE ibm.texsim.ALL;
USE gr_lib.gr_latches_pkg.ALL;
USE gr_lib.gr_lcb_pkg.ALL;
USE gr_lib.gr_support_pkg.ALL;
---------------------------- ENTITY DECLARATION ----------------------------
ENTITY csa_4to2_single_rail_e_out_b_second IS
    PORT(
    -- INPUT
        a           : IN std_ulogic;
        b           : IN std_ulogic;
        c           : IN std_ulogic;
        d           : IN std_ulogic;
        e_in_b      : IN std_ulogic;
    -- OUTPUT
        sum         : OUT std_ulogic;
        carry       : OUT std_ulogic;
        e_out_b     : OUT std_ulogic
        );
END csa_4to2_single_rail_e_out_b_second;
ARCHITECTURE csa_4to2_single_rail_e_out_b_second OF
csa_4to2_single_rail_e_out_b_second IS
-- *** *** *** *** *** *** *** *** START LOGIC *** *** *** *** *** *** *** ***
signal a_b          : std_ulogic;
signal b_b          : std_ulogic;
signal c_b          : std_ulogic;
signal d_b          : std_ulogic;
signal sum_1st      : std_ulogic;
signal carry_eq     : std_ulogic;
signal sum_eq       : std_ulogic;
signal cout_eq      : std_ulogic;
signal e_in         : std_ulogic;
BEGIN
a_b <= NOT a;
b_b <= NOT b;
c_b <= NOT c;
d_b <= NOT d;
e_in <= NOT e_in_b;
--1st 3:2 compressor
sum_1st     <= ((a_b ) AND (b_b )AND c) OR
            ( (ab ) AND b AND (c_b )) OR
            (       a AND (b_b ) AND (c_b )) OR
            (       a AND b AND c) ;
cout_eq     <= ((a_b ) AND b AND c) OR
            (       a AND_b_b ) AND c) OR
            (       a AND b AND (c_b )) OR
            (       a AND b AND c) ;
--2nd 3:2 compressor
sum_eq      <= ((NOT sum_1st) AND (d_b ) AND e_in) OR
            ( (NOT sum_1st) AND d AND (NOT e_in)) OR
            (       sum_1st AND (d_b ) AND NOT e_in)) OR
            (       sum_1st AND d AND e_in) ;
carry_eq    <= ((NOT sum_1st) AND d AND e_in) OR
            (       sum_1st AND(d_b ) AND e_in) OR
            (       sum_1st AND d AND NOT e_in)) OR
            (       sum_1st AND d AND e_in) ;
sum         <= sum_eq       ;
carry       <= carry_eq     ;
e_out_b     <= NOT cout_eq  ;
END csa_4to2_single_rail_e_out_b_second;
----  ---------------------------------------------------------------------
-- TITLE    : csa_4to2_dual_rail_first
---------------------------- LIBRARY REFERENCES ----------------------------
LIBRARY IEEE; USE ieee.std_logic_1164.ALL;
LIBRARY STD; USE std.standard.ALL;
LIBRARY IBM; USE ibm.std_ulogic_support.ALL;
LIBRARY gr_lib;
USE ibm.synthesis_support.ALL;
USE ibm.texsim_attributes.ALL;
USE ibm.texsim.ALL;
USE gr_lib.gr_latches_pkg.ALL;
USE gr_lib.gr_lcb_pkg.ALL;
USE gr_lib.gr_support_pkg.ALL;
---------------------------- ENTITY DECLARATION ----------------------------
ENTITY csa_4to2_dual_rail_first IS
    PORT(
    -- INPUT
```

-continued

APPENDIX

```
            a          : IN std_ulogic;
            a_b        : IN std_ulogic;
            b          : IN std_ulogic:
            b_b        : IN std_ulogic:
            c          : IN std_ulogic:
            c_b        : IN std_ulogic;
            d          : IN std_ulogic;
            d_b        : IN std_ulogic;
            e_in       : IN std_ulogic;
            e_in_b     : IN std_ulogic;
         --OUTPUT
            sum        : OUT std_ulogic;
            sum_b      : OUT std_ulogic;
            carry      : OUT std_ulogic;
            carry_b    : OUT std_ulogic;
            e_out      : OUT std_ulogic;
            e_out_b    : OUT std_ulogic
            );
END csa_4to2_dual_rail_first;
ARCHITECTURE csa_4to2_dual_rail_first OF csa_4to2_dual_rail_first IS
--  *** *** *** *** *** *** *** *** START LOGIC *** *** *** *** *** *** *** ***
--signal a_b        : std_ulogic:
--signal b_b        : std_ulogic;
--signal c_b        : std_ulogic;
--signal d_b        : std_ulogic;
signal sum_1st      : std_ulogic;
signal carry_eq     : std_ulogic;
signal sum_eq       : std_ulogic;
signal cout_eq      : std_ulogic;
--signal e_in       : std_ulogic;
BEGIN
--a_b <= NOT a;
--b_b <= NOT b;
--c_b <= NOT c;
--d_b <= NOT d,
--e_in <= NOT e_in_b ;
--1st 3:2 compressor
sum_1st      <= ((a_b ) AND (b_b ) AND c) OR
             ( (ab ) AND b AND (c_b ) ) OR
             (     a AND (b_b ) AND (c_b )) OR
             (     a AND b AND c) ;
cout_eq      <= ((a_b ) AND b AND c) OR
             (     a AND(b_b ) AND c) OR
             (     a AND b AND (c_b ) ) OR
             (     a AND b AND c) ;
--2nd 3:2 compressor
sum_eq       <= ((NOT sum_1st) AND (d_b ) AND e_in) OR
             ( NOT sum_1st) AND d AND NOT e_in)) OR
             (     sum_1st AND (d_b ) AND NOT e_in)) OR
             (     sum_1st AND d AND e_in) ;
carry_eq     <= ((NOT sum_1st) AND d AND e_in) OR
             (     sum_1st AND(d_b ) AND e_m) OR
             (     sum_1st AND d AND (NOT e_in)) OR
             (     sum_1st AND d AND e_in) ;
sum          <= sum_eq        ;
carry        <= carry_eq      ;
e_out        <= cout_eq       ;
sum_b        <= NOT sum_eq    ;
carry_b      <= NOT carry_eq  ;
e_out_b      <= NOT cout_eq   ;
END csa_4to2_dual_rail_first;
---- -------------------------------------------------------------------------
-- TITLE   : csa_4to2_dual_rail_second
---------------------------- LIBRARY REFERENCES -----------------------------
LIBRARY IEEE; USE ieee.std_logic_1164.ALL;
LIBRARY STD; USE std.standard.ALL;
LIBRARY IBM; USE ibm.std_logic_support.ALL;
LIBRARY gr_lib;
USE ibm.synthesis_support.ALL;
USE ibm.texsim_attributes.ALL;
USE ibm.texsim.ALL;
USE gr_lib.gr_latches_pkg.ALL;
USE gr_lib.gr_lcb_pkg.ALL;
USE gr_lib.gr_support_pkg.ALL;
---------------------------- ENTITY DECLARATION -----------------------------
ENTITY csa_4to2_dual_rail_second IS
    PORT(
```

-continued

APPENDIX

```
   -- INPUT
      a           : IN std_ulogic;
      a_b         : IN std_ulogic;
      b           : IN std_ulogic;
      b_b         : IN std_ulogic;
      c           : IN std_ulogic;
      c_b         : IN std_ulogic;
      d           : IN std_ulogic;
      d_b         : IN std_ulogic;
      e_in        : IN std_ulogic;
      e_in_b      : IN std_ulogic;
   -- OUTPUT
      sum         : OUT std_ulogic;
      sum_b       : OUT std_ulogic;
      carry       : OUT std_ulogic;
      carry_b     : OUT std_ulogic;
      e_out       : OUT std_ulogic;
      e_out_b     : OUT std_ulogic
      );
END csa_4to2_dual_rail_second;
ARCHITECTURE csa_4to2_dual_rail_second OF csa_4to2_dual_rail_second IS
   *** *** *** *** *** *** *** *** START LOGIC *** *** *** *** *** *** *** ***
--signal a_b       : std_ulogic;
--signal b_b       : std_ulogic;
--signal c_b       : std_ulogic;
--signal d_b       : std_ulogic;
signal sum_1st     : std_ulogic;
signal carry_eq    : std_ulogic;
signal sum_eq      : std_ulogic;
signal cout_eq     : std_ulogic;
--signal e_in      : std_ulogic;
BEGIN
--a_b  <= NOT a;
--b_b  <= NOT b;
--c_b  <= NOT c;
--d_b  <= NOT d;
--e_in <= NOT e_in_b;
--1st 3:2 compressor
sum_1st      <= ((a_b ) AND (b_b ) AND c) OR
             ( (a_b ) AND b AND (c_b )) OR
             (      a AND(b_b ) AND (c_b )) OR
             (      a AND b AND c) ;
cout_eq      <= ((a_b ) AND b AND c) OR
             (      a AND_b_b ) AND c) OR
             (      a AND b AND (c_b )) OR
             (      a AND b AND c) ;
--2nd 3:2 compressor
sum_eq       <= ((NOT sum_1st) AND (d_b ) AND e_in) OR
             ( (NOT sum_1st) AND d AND (NOT e_in)) OR
             (      sum_1st AND (d_b ) AND (NOT e_in)) OR
             (      sum_1st AND d AND e_in) ;
carry_eq     <= ((NOT sum_1st) AND d AND e_in) OR
             (      sum_1st AND (d_b ) AND e_in) OR
             (      sum_1st AND d AND (NOT e_in)) OR
             (      sum_1st AND d AND e_in) ;
sum          <= sum_eq        ;
carry        <= carry_eq      ;
e_out        <= cout_eq       ;
sum_b        <= NOT sum_eq    ;
carry_b      <= NOT carry_eq  ;
e_out_b      <= NOT cout_eq   ;
END csa_4to2                  .
```

What is claimed is:

1. A compressor circuit suitable for use in an arithmetic unit of a microprocessor, comprising:

a first stage configured to receive a set of four input signals and further configured to generate a first intermediate signal indicative of the XNOR of a first pair of the input signals and to generate a second intermediate signal indicative of the XNOR of a second pair of the input signals;

a second stage configured to receive at least a portion of the signals generated by the first stage and further configured to generate first and second control signals, the first control signal indicative of the XNOR of the four input signals and the second control signal representing the logical complement of the first control signal;

a carry circuit configured to receive at least one of the control signals and further configured to generate a carry bit based at least in part on the state of the received control signal; and a sum circuit configured to receive at least one of the control signals and further configured to generate a sum bit based at least in part on the state of the received control signal;

wherein at least one of the first stage, second stage, sum circuit, and carry circuit include at least one CMOS transmission gate comprised of an n-channel transistor and a p-channel transistor having their source/drain terminals connected in parallel, wherein the p-channel transistor gate is driven by the logical complement of the n-channel transistor gate.

2. The compressor circuit of claim 1, wherein the compressor circuit is further configured to receive a fifth signal generated by a compressor circuit in a preceding adjacent bit position and further wherein the sum and carry circuit are configured to generate the sum and carry bits based at least in part upon the state of the fifth signal.

3. The compressor circuit of claim 2, further comprising an output circuit configured to produce an output signal that is provided to a compressor of a successive adjacent bit position, based upon the state of at least some of the four input signals and their logical complements.

4. The compressor circuit of claim 3, further wherein the compressor is configured to generate simultaneously, a true form of at least one of the outputs and a complementary form of the at least one output.

5. The compressor circuit of claim 4, wherein the compressor is configured to generate only the complementary form of the output signal provided to the compressor of the successive adjacent bit position.

6. The compressor circuit of claim 5, wherein the carry circuit is configured to receive the complementary form of the output signal from the compressor of the preceding adjacent bit position and to generate the carry signal based at least in part thereon.

7. The compressor circuit of claim 1, wherein the compressor circuit includes at least one CMOS transmission gate in the first stage and a least one CMOS transmission gate in the second stage, wherein source/drain of the second stage transmission gate is connected in series with the source/drain of the first stage transmission gate.

8. The compressor circuit of claim 1, wherein the circuit comprises a silicon-on-insulator (SOI) integrated circuit.

9. An arithmetic multiplier suitable for use in a data processing system and including a compressor circuit, the compressor circuit comprising:

a first stage configured to receive a set of four input signals and further configured to generate a first intermediate signal indicative of the XNOR of a first pair of the input signals and to generate a second intermediate signal indicative of the XNOR of a second pair of the input signals;

a second stage configured to receive at least a portion of the signals generated by the first stage and further configured to generate first and second control signals, the first control signal indicative of the XNOR of the four input signals and the second control signal representing the logical complement of the first control signal;

a carry circuit configured to receive at least one of the control signals and further configured to generate a carry bit based at least in part on the state of the received control signal; and a sum circuit configured to receive at least one of the control signals and further configured to generate a sum bit based at least in part on the state of the received control signal;

wherein at least one of the first stage, second stage, sum circuit, and carry circuit include at least one CMOS transmission gate comprised of an n-channel transistor and a p-channel transistor having their source/drain terminals connected in parallel, wherein the p-channel transistor gate is driven by the logical complement of the n-channel transistor gate.

10. The arithmetic multiplier of claim 9, wherein the compressor circuit is further configured to receive a fifth signal generated by a compressor circuit in a preceding adjacent bit position and further wherein the sum and carry circuit are configured to generate the sum and carry bits based at least in part upon the state of the fifth signal.

11. The arithmetic multiplier of claim 10, further comprising an output circuit configured to produce an output signal that is provided to a compressor of a successive adjacent bit position, based upon the state of at least some of the four input signals and their logical complements.

12. The arithmetic multiplier of claim 11, further wherein the compressor is configured to generate simultaneously, a true form of at least one of the outputs and a complementary form of the at least one output.

13. The arithmetic multiplier of claim 12, wherein the compressor is configured to generate only the complementary form of the output signal provided to the compressor of the successive adjacent bit position.

14. The arithmetic multiplier of claim 13, wherein the carry circuit is configured to receive the complementary form of the output signal from the compressor of the preceding adjacent bit position and to generate the carry signal based at least in part thereon.

15. The arithmetic multiplier of claim 9, wherein the compressor circuit includes at least one CMOS transmission gate in the first stage and a least one CMOS transmission gate in the second stage, wherein source/drain of the second stage transmission gate is connected in series with the source/drain of the first stage transmission gate.

16. The arithmetic multiplier of claim 9, wherein the circuit comprises a silicon-on-insulator (SOI) integrated circuit.

17. A data processing system including processor, memory, and I/O means, the processor including an arithmetic unit including a compressor circuit suitable for use in an arithmetic unit of a microprocessor, the compressor comprising:

a first stage configured to receive a set of four input signals and further configured to generate a first intermediate signal indicative of the XNOR of a first pair of the input signals and to generate a second intermediate signal indicative of the XNOR of a second pair of the input signals;

a second stage configured to receive at least a portion of the signals generated by the first stage and further configured to generate first and second control signals, the first control signal indicative of the XNOR of the four input signals and the second control signal representing the logical complement of the first control signal;

a carry circuit configured to receive at least one of the control signals and further configured to generate a carry bit based at least in part on the state of the received control signal; and a sum circuit configured to receive at least one of the control signals and further configured to generate a sum bit based at least in part on the state of the received control signal;

wherein at least one of the first stage, second stage, sum circuit, and carry circuit include at least one CMOS transmission gate comprised of an n-channel transistor and a p-channel transistor having their source/drain terminals connected in parallel, wherein the p-channel transistor gate is driven by the logical complement of the n-channel transistor gate.

18. The data processing system of claim 17, wherein the compressor circuit is further configured to receive a fifth signal generated by a compressor circuit in a preceding adjacent bit position and further wherein the sum and carry circuit are configured to generate the sum and carry bits based at least in part upon the state of the fifth signal.

19. The data processing system of claim 18, further comprising an output circuit configured to produce an output signal that is provided to a compressor of a successive adjacent bit position, based upon the state of at least some of the four input signals and their logical complements.

20. The data processing system of claim 19, further wherein the compressor is configured to generate simultaneously, a true form of at least one of the outputs and a complementary form of the at least one output.

21. The data processing system of claim 20, wherein the compressor is configured to generate only the complementary form of the output signal provided to the compressor of the successive adjacent bit position.

22. The data processing system of claim 21, wherein the carry circuit is configured to receive the complementary form of the output signal from the compressor of the preceding adjacent bit position and to generate the carry signal based at least in part thereon.

23. The data processing system of claim 17, wherein the compressor circuit includes at least one CMOS transmission gate in the first stage and a least one CMOS transmission gate in the second stage, wherein source/drain of the second stage transmission gate is connected in series with the source/drain of the first stage transmission gate.

24. The data processing system of claim 17, wherein the circuit comprises a silicon-on-insulator (SOI) integrated circuit.

* * * * *